No. 847,266. PATENTED MAR. 12, 1907.
G. W. UPTON.
ARTIFICIAL BAIT AND WEED GUARD.
APPLICATION FILED AUG. 16, 1906.
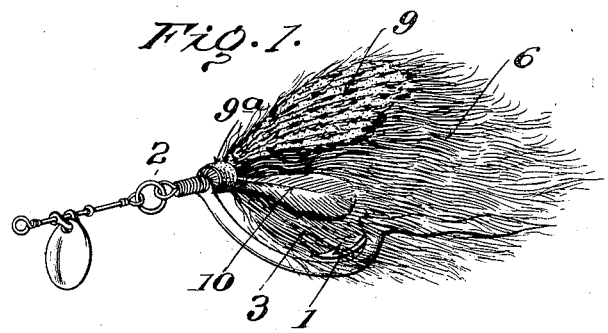
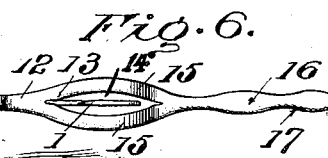
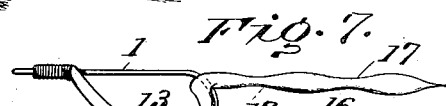
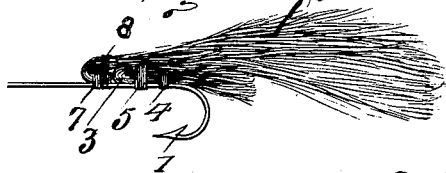
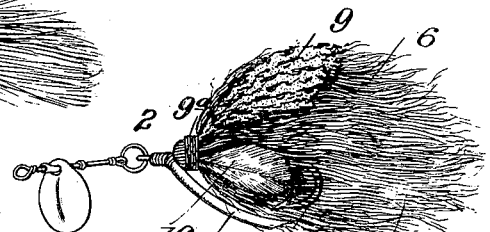
WITNESSES:
INVENTOR
George W. Upton.
BY
ATTORNEY

UNITED STATES PATENT OFFICE.

GEORGE W. UPTON, OF WARREN, OHIO.

ARTIFICIAL BAIT AND WEED-GUARD.

No. 847,266.      Specification of Letters Patent.      Patented March 12, 1907.

Application filed August 16, 1906. Serial No. 330,882.

*To all whom it may concern:*

Be it known that I, GEORGE W. UPTON, of Warren, in the county of Trumbull and State of Ohio, have invented certain new and useful Improvements in Artificial Bait and Weed-Guards; and I do hereby declare the following to be a full, clear, and exact description of the invention, such as will enable others skilled in the art to which it appertains to make and use the same.

The primary object of this invention is to provide an artificial bait of such material as to be highly attractive to fish and so attach it to the hook as to prevent its being torn away, and a further object is to provide a weed-guard which will effectively protect the hook in whatever position it may lie and which will add to the attractiveness of the bait.

It is well known that all game fish, and especially those of the *Micropterus* family, subsist largely on crayfish, and my object is to produce an artificial bait which when wet will have the appearance of the crayfish.

The invention will be hereinafter fully set forth, and particularly pointed out in the claims.

In the accompanying drawings, Figure 1 is an elevation of a hook and bait embodying my present improvements. Figs. 2, 3, 4, and 5 show the manner in which the hairs are secured to a hook. Fig. 6 is an edge view of the hook and guard detached. Fig. 7 is a side view thereof. Fig. 8 shows a modified form of guard.

Referring to the drawing, 1 designates the hook, and 2 the artificial bait intended to represent in its entirety the body of the crayfish. For this purpose I employ hairs from the tail of a calf or other hairs of similar texture and arrange them, preferably, in two or more separate masses. The mass or bunch 3 is first secured to the shank of the hook by a binder 4, preferably of thread. The mass is then turned back upon itself and a second binder 5 is applied thereto, thus securely fastening the hairs to the hook. The other bunch or mass 6 is likewise secured to the shank of the hook by a binder 7, with the ends projecting over the end of the shank. It is then turned back upon itself and again secured by a second binder 8, the mass lying over the first mass and concealing the secured end of each mass. Of course one continuous thread may serve as the two binders for each bunch or mass of hair. The hair being brown gives to the bait the color of some crayfish. Hairs from a calf's tail are not waterproof, as are the hairs of the buck's tail, heretofore generally used as baits, and in consequence they mat down into a body. By securing the hairs in one or more separate masses along the shank of the hook more hair can be used without danger of being then easily pulled out, as is the case where hairs are attached in a single thick bunch, rendering effective binding impracticable. Because of the natural odor and feel of the hairs of the calf's tail the bait will not ordinarily be ejected by the fish, as are feather lures.

In order to give to the bait the dark-moss color of the back of the crayfish, I employ a few threads 9 of peacock-harl or anything capable of effecting the necessary simulation. This is preferably secured by a binder 9ᵃ over the attached ends of the mass 6. The harl, which ordinarily lies on top, maintains its color when wet, thus adding to the attractiveness of the bait. The belly of the crayfish is simulated by a red hanger 10 beneath the hairs and which may be of any material that retains its color when wet, such as a feather from the ibis, or it may be composed of silk or other material. It is preferably secured by the binder 9ᵃ.

12 designates the weed-guard or deflector, made of springy rubber or other non-metallic substance. It is curved or arched to form a bend 13, with an opening 14 formed by and between two corresponding spaced-apart sides 15 and terminates in a flexible tail-like portion 16, which is narrowed at different points, as at 17. The two sides 15 normally occupy a plane on opposite sides of the point and barb of the hook. The guard is made of sufficient stiffness to normally maintain its position relatively to the hook, so that the point of the latter will penetrate beyond the opening only when the guard and hook are compressed from opposite directions. Thus the hook is prevented from catching on weeds or other inanimate things, and instead of repelling fish, as do those guards made of wire or other metal, it will positively attract them, since being of soft flexible material and the tail having the appearance of a worm the device is rendered more attractive. By cutting away and narrowing the tail, as at 17, the resistance of the water impinging on the faces of the wider portions when the bait is drawn through the water will cause it to swing from side to side like unto the motions of a live worm, while the bent portion of the guard enhances the deception. Although the guard may be made of any suitable non-metallic substance, yet I prefer to employ rubber. The guard may be used on any fish-hook, with or without the calf-tail flies.

In Fig. 8 I have shown a modified form of guard in the form of a single arm attached at one end to the hook-shank and with its other end normally lying in close proximity to the point of the hook, thereby serving to deflect weeds and the like from the latter. In this instance the guard is also formed of spring-rubber or similar material other than metal.

The advantages of my invention will be apparent to those skilled in the art. It will be observed that by securing the hair to the shank in two or more masses each may be more firmly attached, and hence the mass may not be readily displaced. Furthermore, by using hair which will readily mat when wet the bait is caused to assume the appearance of a form of live bait most attractive to gamy fish, and in addition, the lifelike appearance of the guard adds to the attractiveness of the bait, and the guard itself is so formed that the point and barb of the hook can be exposed only upon the application of pressure from opposite directions—that is to say, against the hook and the curved portion of the guard.

I claim as my invention—

1. An artificial bait composed of hair, peacock-harl on one side of the hair, and a feather or the like on the opposite side of such hair, the whole when wet having the appearance of a crayfish.

2. An artificial bait composed of a hook, hair attached thereto in separate masses, and objects of different colors secured on the exterior of said masses.

3. An artificial bait comprising a hook, hair secured thereto in a plurality of separate masses, harl attached to one of said masses, and a colored object also secured to said mass on the side opposite to the harl.

4. A fish-hook, hair secured thereto in separate bunches, each bunch being doubled back on itself, and means for retaining each bunch separately, the mass of hair being extended beyond the bend of the hook.

5. The combination with a fish-hook, of a guard lying in protective relation to the point of the hook, such guard being composed of springy rubber.

6. The combination with a fish-hook, of a guard lying in protective relation to the point of the hook, such guard being composed of springy non-metallic substance.

7. The combination with a fish-hook, of a guard extended over the point thereof and formed with a flexible tail.

8. The combination with a fish-hook, of a guard extended over the point thereof and having a flexible tail formed with narrowed portions.

9. A fish-hook having a guard formed with an opening and extended around the bend of the hook, the point of said hook normally lying within the plane of that portion of the guard formed with said opening.

10. A fish-hook having a guard composed of springy rubber and extending on opposite sides of the point of the hook, that portion of the guard above such point being formed with an opening, the end of the guard terminating in a tail of varying width.

11. In combination with an artificial bait, a fish-hook and a flexible body attached to the hook, said body being formed with a slit for the passage of the hook, the sides of the slitted portion being normally on either side of and as high as the point and barb of the hook.

12. In combination with an artificial bait, a hook, a flexible body attached at one end to the bend of said hook and curved to simulate a worm, a portion of said body protruding as high as the point of the hook above its shank.

13. An attachment for fish-hooks, made of elastic or resilient material and adapted to be fastened to the head of a hook, a portion of such attachment being thinner or narrower than its extremities.

In testimony whereof I have signed this specification in the presence of two subscribing witnesses.

GEORGE W. UPTON.

Witnesses:
HOMER E. STEWART,
WASHINGTON HYDE.